(12) United States Patent
Raghunathan et al.

(10) Patent No.: US 9,093,842 B2
(45) Date of Patent: Jul. 28, 2015

(54) METHOD FOR GLOBALLY OPTIMIZING POWER FLOWS IN ELECTRIC NETWORKS

(75) Inventors: Arvind Raghunathan, Brookline, MA (US); Ajit Gopalakrishnan, Pittsburgh, PA (US); Daniel Nikolaev Nikovski, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 446 days.

(21) Appl. No.: 13/587,547

(22) Filed: Aug. 16, 2012

(65) Prior Publication Data

US 2014/0052301 A1 Feb. 20, 2014

(51) Int. Cl.
*G06F 1/26* (2006.01)
*H02J 3/00* (2006.01)

(52) U.S. Cl.
CPC ........................................ *H02J 3/00* (2013.01)

(58) Field of Classification Search
CPC .................................. H02J 3/00; G06F 17/11
USPC .................................................. 700/33, 286
See application file for complete search history.

(56) References Cited

U.S. PATENT DOCUMENTS

| | | | |
|---|---|---|---|
| 6,625,520 B1 | 9/2003 | Chen et al. | |
| 6,775,597 B1 | 8/2004 | Ristanovic et al. | |
| 7,277,832 B2 * | 10/2007 | Chiang | 703/2 |
| 8,126,685 B2 | 2/2012 | Nasle et al. | |
| 2013/0190938 A1 * | 7/2013 | Zadeh et al. | 700/291 |
| 2014/0032187 A1 * | 1/2014 | Legbedji et al. | 703/2 |

FOREIGN PATENT DOCUMENTS

WO WO/2012/061674 A3 * 5/2012

OTHER PUBLICATIONS

J. Lavaei and S. H. Low, "Zero Duality Gap in Optimal Power Flow Problem," in IEEE Transactions on Power Systems, vol. 27, No. 1, Feb. 2012, p. 92-107.*
J.A. Taylor and F.S. Hover, "Conic Relaxations for Transmission System Planning," in North American Power Symposium (NAPS), IEEE Aug. 2011, p. 1-4.*
J. Lavaei and S. H. Low, "Zero Dulaity Gap in Optimal Power Flow," IEEE Transactions on Power Systems, in press.

(Continued)

*Primary Examiner* — Mohammad Ali
*Assistant Examiner* — Saad M Kabir
(74) *Attorney, Agent, or Firm* — Dirk Brinkman; Gene Vinokur

(57) ABSTRACT

A power flow problem (OPF) in an electric power network is globally optimized using a branch and bound tree of nodes connected by edges. The BB initially includes at least a root node, and each node represents a feasible region of limits on voltages and powers. An upper bound on the OPF problem is solved for selected nodes using nonlinear programming, while a lower bound is solved using a convex relaxation. The lowest upper and lower bounds are updated using the current upper and lower bound. If a difference between the lowest upper and lowest lower bound is less than a threshold, then outputting the voltages and the powers for the electric power network as represented by the feasibility region for the selected node. Otherwise, the feasible region of the node is partitioned to replace the node. The process is repeated until the tree is empty.

7 Claims, 5 Drawing Sheets

(56) References Cited

OTHER PUBLICATIONS

S. Bose, D. Gayme, S. Low, and K. M. Chandy, "Quadratically constrained quadratic programs on acyclic graphs with application to power flow," http://arxiv.org/pdf/1203.5599.pdf, 2012.

B. Zhang and D. Tse, "Geometry of feasible injection region of power networks," http://arxiv.org/pdf/1107.1467.pdf, 2011.

S. Sojoudi and J. Lavaei, "Network topologies guaranteeing zero duality gap for optimal power flow problem," submitted for publication, 2011.

D. T. Phan, "Lagrangian Duality and Branch-and-Bound Algorithms for Optimal Power Flow," Operations Research 60 (2), 275-285, 2012.

* cited by examiner $Y_{bus}$ is a $|N| \times |N|$ matrix with elements defined as $$Y_{bus}(i,j) = \begin{cases} -y_{ij} \text{ if } (i,j) \in E \\ -y_{ji} \text{ if } (j,i) \in E \\ \sum_{(i,j) \in E} y_{ij} + \sum_{(j,i) \in E} y_{ji} \end{cases}$$

$Y_{bus,i} = \zeta_i \zeta_i^T Y_{bus}; Y_{bus,ij} = y_{ij} \zeta_i \zeta_i^T - y_{ij} \zeta_i \zeta_j^T$ $Y_i = \frac{1}{2} \begin{bmatrix} \text{Re}(Y_{bus,i} + Y_{bus,i}^T) & \text{Im}(Y_{bus,i}^T - Y_{bus,i}) \\ \text{Im}(Y_{bus,i} - Y_{bus,i}^T) & \text{Re}(Y_{bus,i} + Y_{bus,i}^T) \end{bmatrix}; \overline{Y}_i = -\frac{1}{2} \begin{bmatrix} \text{Im}(Y_{bus,i} + Y_{bus,i}^T) & \text{Re}(Y_{bus,i} - Y_{bus,i}^T) \\ \text{Re}(Y_{bus,i} - Y_{bus,i}^T) & \text{Im}(Y_{bus,i} + Y_{bus,i}^T) \end{bmatrix}$ $Y_{ij} = \frac{1}{2} \begin{bmatrix} \text{Re}(Y_{bus,ij} + Y_{bus,ij}^T) & \text{Im}(Y_{bus,ij}^T - Y_{bus,ij}) \\ \text{Im}(Y_{bus,ij} - Y_{bus,ij}^T) & \text{Re}(Y_{bus,ij} + Y_{bus,ij}^T) \end{bmatrix}; \overline{Y}_{ij} = -\frac{1}{2} \begin{bmatrix} \text{Im}(Y_{bus,ij} + Y_{bus,ij}^T) & \text{Re}(Y_{bus,ij} - Y_{bus,ij}^T) \\ \text{Re}(Y_{bus,ij} - Y_{bus,ij}^T) & \text{Im}(Y_{bus,ij} + Y_{bus,ij}^T) \end{bmatrix}$ where $\zeta_i$ denotes a vector of size $|N|$ with a 1 at the $i$-th component and zero elsewhere.

FIG. 8

METHOD FOR GLOBALLY OPTIMIZING POWER FLOWS IN ELECTRIC NETWORKS

FIELD OF THE INVENTION

The present invention relates generally to electric power networks, and more particularly to optimizing power flows in the networks.

BACKGROUND OF THE INVENTION

An electric power network includes buses connected to transmission lines. The buses are connected to generators and loads. Optimal power flow (OPF) analysis is often used for monitoring and controlling the operation of the network. The power flow depends, in part, on voltage magnitudes and phase angles. Generation amounts and voltage levels on the buses are optimized by minimizing an objective function subject to constraints, such as the magnitudes, phases, power transferred, generator capacity, thermal losses, and the like.

Most conventional OFF optimizations:
1) Use simplifying assumptions, such as small differences between phase angles at buses, to reduce quadratic equalities and inequalities to linear equalities and inequalities. However, such assumptions may not be valid for all networks.
2) Use nonlinear programming (NLP) to determine a lowest cost per kilowatt hour delivered. However, NLP cannot guarantee the globally optimal voltages and generator levels for efficient operation.
3) Use a relaxation of OPF to convex optimization, such as second-order cone programming (SOCP). However, such relaxed convex optimizations do not guarantee feasible solutions with a global minimum for the original problem.
4) Use a relaxation of OPF to semi-definite programming (SDP), which requires changing resistances of lossless lines in the network, restrictions on the network topology or constraints, or require modification of the network to ensure global optimality.
5) Use a branch & bound (BB) procedure with Lagrangian duality (LD) based lower bounds that do not consider all necessary constraints and are considerably slow due to the irregular nature of the optimization problem.

Thus, there remains a need to globally optimize an electric power networks in an efficient and expedient manner.

U.S. Pat. No. 6,625,520 describes a system and method for operating an electric power system that calculates optimal power flow and available transfer capability of the electric power system based on the optimal power flow. The system derives data associated with the initial phase angle and maximum electric power value of a generator by calculating mechanical output and electrical output of a generator, including a generator phase angle defined by a time function in a condition that the generator phase angle does not exceed a preset value.

SUMMARY OF THE INVENTION

The embodiments of the invention provide a method for globally optimizing a power flow in electric power networks.

A spatial branch and bound (BB) procedure ensures that the globally optimal solution is attained. The BB procedure partitions the feasible region of the power flow problem, specifically by partitioning the bound on generation variables and also constraints on voltage magnitudes, which speeds up convergence.

A lower bound on the optimal solution is determined by semi-definite programming (SDP), which provides a minimal lower bound. The SDP uses interior point procedures, which bound the computational complexity.

BRIEF DESCRIPTION OF THE DRAWING

FIG. 8 is a block diagram of matrices used by embodiments of the invention.

DETAILED DESCRIPTION OF THE PREFERRED EMBODIMENTS

Electrical Power Network Topology

Figure 1:
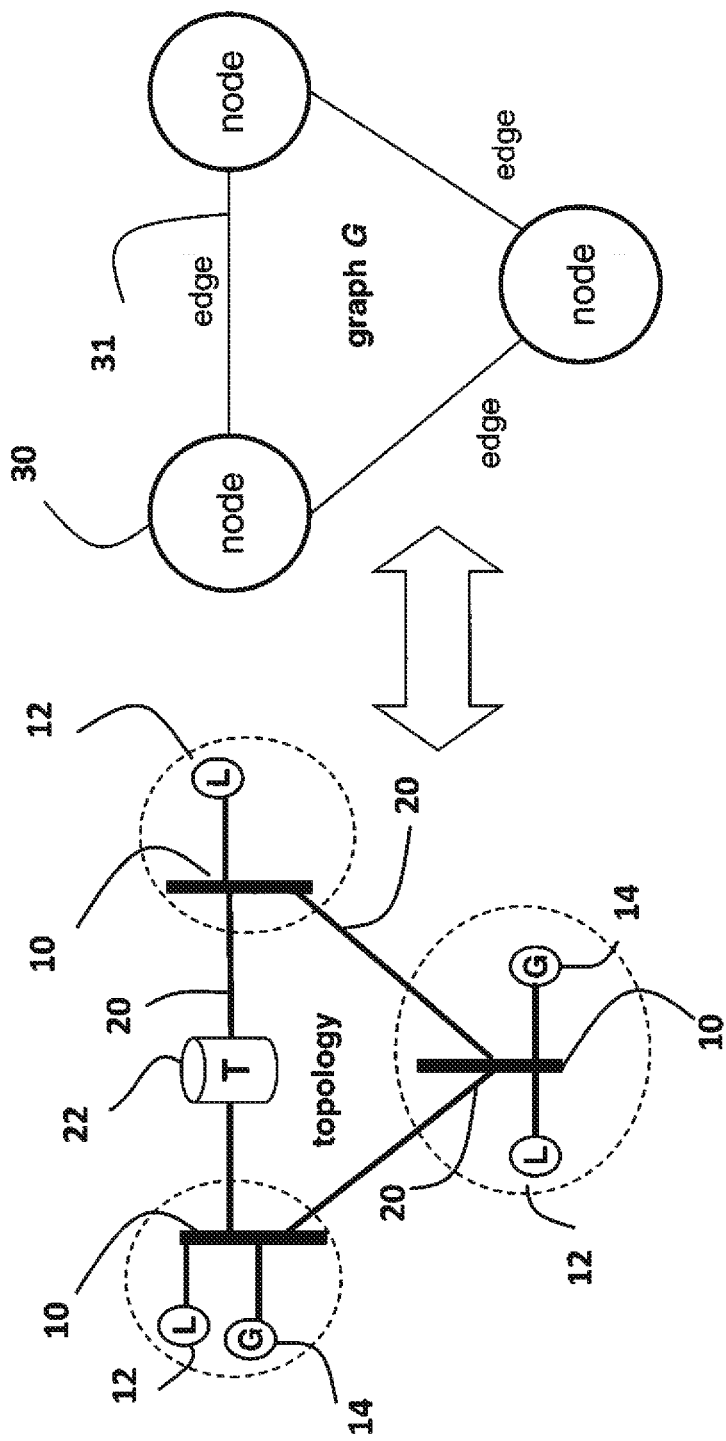
FIG. 1 is a schematic of an electrical power network and a graphical representation that can use embodiments of the invention.

FIG. 1 shows an electric power network topology that can use embodiments of our invention. The network can include AC and DC components connected by convertors. The only requirement is that variables and constraints that control the operation of the network are continuously controllable.

The network includes buses 10 connected to loads 12 and generators 14. The buses are interconnected by transmission lines 20, also known as branches. Some of the transmission lines can be connected to transformers 22.

The generators generate active power (measured in MW), and reactive power (measured in MVar). The loads consume the power. The power is defined by voltage magnitude and phase angle.

The parameters for the optimization include, but are not limited to, an admittance matrix based on the branch impedance and bus fixed shunt admittance, and the flow capacity ratings, i.e., the maximal total power flow constrained by thermal ratings.

The network can be represented by a graph G of nodes 30 connected by edges 31.

Input

Input to the method includes the following:
a. A graph G(N,E) with a set of N nodes connected by a set of E edges (i,j).
b. The admittance of the lines $y_{ij}=g_{ij}+jb_{ij} \forall (i,j) \in E$, where g represents conductance of the line, b represents susceptance (imaginary part of the admittance) of the line with $j=\sqrt{-1}$.
c. Constraints on active power $P_i^{G,min}, P_i^{G,max}$ $i \in N$ that can be produced by the generators, and the reactive power $Q_i^{G,min}, Q_i^{G,max} \forall i \in N$ that can be produced by the generators.
d. Constraints $S_{ij}^{max}, P_{ij}^{max} \forall (i,j) \in E$ on apparent and active power transferred on the lines.
e. Limits $V_i^{min}, V_i^{max} \forall i \in N$ on voltage magnitudes at the buses.
f. Constraints $L_{ij}^{max} \forall (i,j) \in E$ on thermal losses on the lines.

Output

Output of the method includes complex valued voltages $V_i \forall i \in N$ at the buses, and active and reactive power levels $P_i^G, Q_i^G \forall i \in N$ of the generators.

Global Optimization

For the global optimization, we use a decision function $f(P^G, Q^G, V)$ that depends on active power generation variables $P^G = (P_1^G, \ldots, P_{|N|}^G)$, reactive power generation variables $Q^G = (Q_1^G, \ldots, Q_{|N|}^G)$, and the complex valued voltages $V = (V_1, \ldots, V_{|N|})$ at the buses.

In the preferred embodiment, the form of the function $f$ is quadratic and strictly increasing:

$$f(P^G, Q^G, V) = \sum_{i \in N} \left( c_{2i}(P_i^G)^2 + c_{1i} P_i^G + c_{0i} \right),$$

where c indicates constants, with $c_{2i}, c_{1i} \geq 0 \forall i \in N$.

We use equality constraints, inequality constraints and bounds on the decision variables to model the limits of feasible operation of the network. We model the physics of the electrical network by the equality constraints $$h_n(P^G, Q^G, V) = 0 \forall n = 1, \ldots, Ne,$$

where Ne indicates the number of equality constraints.

We model the constraints on the power transferred on the lines and thermal losses ensuring feasible operation as inequality constraints $$g_n(P^G, Q^G, V) \leq 0 \forall n = 1, \ldots, N_i,$$

where $N_i$ indicates the number of inequality constraints.

We also impose constraints on power generation and voltage magnitudes at the buses.

To determine the voltages at the buses and the powers produced by the generators, we solve the following optimization problem to global optimality:

minimize $f(P^G, Q^G, V)$ subject to $h_n(P^G, Q^G, V) = 0 \forall n = 1, \ldots, Ne$ $g_n(P^G, Q^G, V) \leq 0 \forall n = 1, \ldots, Ni$ $P_i^{G,min} \leq P_i^G \leq P_i^{G,max}, Q_i^{G,min} \leq Q_i^G \leq Q_i^{G,max} \forall i \in N$ $$V_i^{min} \leq \sqrt{Re(V_i)^2 + Im(V_i)^2} \leq V_i^{max} \forall i \in N, \quad (1)$$

where $Re(V_i), Im(V_i)$ denote the real and imaginary parts of the complex voltage $V_i$, respectively, and $h_n$ represents equality constraints and $g_n$ represents equality constraints.

Constraints

In the preferred embodiment, the equality constraints $$h_n(P^G, Q^G, V) = 0 \forall n = 1, \ldots, Ne$$

are represented as

Power flows on the lines $$\left. \begin{array}{l} S_{ij} = V_i(y_{ij}(V_i - V_j))* \\ S_{ji} = V_j(y_{ij}(V_j - V_i))* \end{array} \right\} \forall (i,j) \in E$$

Power balances at the buses $$\sum_{j \in N(i)} S_{ij} = S_i^G - S_i^D \forall i \in N$$

where $S_{ij} = P_{ij} + jQ_{ij}$ denotes the complex valued power transferred from bus i to bus j, $S_{ji} = P_{ji} + jQ_{ij}$ denotes the complex valued power transferred from bus j to bus i, $(V_i)*$ denotes the complex conjugate of the complex valued variable, $S_i^G = P_i^G + jQ_i^G$ denotes the complex valued power produced by the generators and $S_i^D = P_i^D + jQ_i^D$ denotes the complex valued power demands. The variables representing power flow on the lines are used for convenience.

In the preferred embodiment the inequality constraints $$g_n(P^G, Q^G, V) = 0 \forall n = 1, \ldots, Ni$$

are represented as

Limit on apparent power transferred on lines $$\left. \begin{array}{l} |S_{ij}| \leq S_{ij}^{max} \\ |S_{ji}| \leq S_{ij}^{max} \end{array} \right\} \forall (i,j) \in E$$

Limit on active power transferred on lines $$\left. \begin{array}{l} Re(S_{ij}) \leq P_{ij}^{max} \\ Re(S_{ji}) \leq P_{ij}^{max} \end{array} \right\} \forall (i,j) \in E$$

Limit on thermal loss on lines $$Re(S_{ij} + S_{ji}) \leq L_{ij}^{max} \forall (i,j) \in E$$

Branch and Bound

Figure 2:
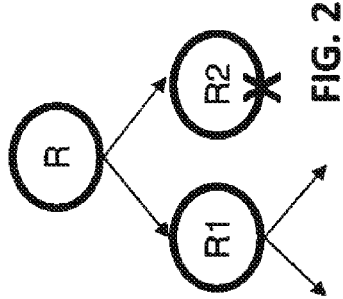
FIG. 2 is a branch and bound tree used by embodiments of the invention.

As shown in FIG. 2, we use a branch and bound (BB) procedure to search a spatial BB tree. The tree includes a root node R, and after partitioning, child nodes R1 and R2. The tree is used to determine the global minimum for the OPF by constructing a convex relaxation of the feasible region R associated with the OPF(1), that is easy to solve and provides a lower bound (L) on the optimal objective function value.

In this description, the problem is described as a minimization. However, it should be understood, the problem can also be posed as a maximization by reversing the sign of the objective function.

The lower bound for OPF(1) is obtained by solving a semidefinite (SDP) relaxation of the OPF. The SDP that is solved is given by:

minimize $F(P^G, Q^G, W)$ subject to $H_n(P^G, Q^G, W) = 0 \forall n = 1, \ldots, Ne$ $G_n(P^G, Q^G, W) \leq 0 \forall n = 1, \ldots, Ni$ $P_i^{G,min} \leq P_i^G \leq P_i^{G,max} \forall i \in N$ $Q_i^{G,min} \leq Q_i^G \leq Q_i^{G,max} \forall i \in N$ $(V_i^{min})^2 \leq Tr(M_i W) \leq (V_i^{max})^2 \forall i \in N$ $W \succeq 0, W$ is $2|N| \times 2|N|$ symmetric matrix  (Eq. 2)

where $W \succeq 0$ denotes that matrix W must be positive semidefinite, the matrix operator Tr( ) is defined as $$Tr(AB) = \sum_{n=1}^{|N|} \sum_{m=1}^{|N|} A_{n,m} B_{m,n}$$

and the matrix $M_i$ is defined as $$M_i = \begin{bmatrix} \zeta_i \zeta_i^T & 0 \\ 0 & \zeta_i \zeta_i^T \end{bmatrix},$$

where $\xi_i$ denotes a vector of size $|N|$ with a 1 at the i-th component and zeros elsewhere.

The matrix W is a relaxation of the outer vector product of the voltage variable vector, $$\begin{bmatrix} \text{Re}(V) \\ \text{Im}(V) \end{bmatrix} [\text{Re}(V) \quad \text{Im}(V)].$$

In the preferred embodiment, the objective function is, $$F(P^G, Q^G, V) = \sum_{i \in N} \left( c_{2i}(P_i^G)^2 + c_{1i}P_i^G + c_{0i} \right).$$

The equality constraints in the semidefinite relaxation (Eq. 2) are written as, $$\left. \begin{array}{l} P_{ij} = Tr(Y_{ij}W) \\ Q_{ij} = Tr(\overline{Y}_{ij}W) \\ P_{ij} = Tr(Y_{ji}W) \\ Q_{ji} = Tr(\overline{Y}_{ji}W) \end{array} \right\} \forall (i, j) \in E$$

$$P_i^G - P_i^D = Tr(Y_i W) \forall i \in N$$
$$Q_i^G - Q_i^D = Tr(\overline{Y}_i W) \forall i \in N$$

where, the matrices $Y_{ij}, Y_{ji}, Y_i, \overline{Y}_i$ are defined as shown in FIG. 8

Lagrangian Dual of the OPF

In another embodiment, the lower bound (L) is obtained by solving the Lagrangian dual of the OPF (1) using a subgradient procedure. Denoting by $\alpha_i, \beta_i, \lambda_{ij}, \gamma_{ij}$ the multipliers for the equality constraints—respectively active power balance at the buses, reactive power balance at the buses, active line power flows, reactive line power flows and further denoting by $\underline{v}_i, \overline{v}_i, \mu_{ij}$ the multipliers for subset of the inequality constraints—respectively lower bound on voltage magnitude at buses, upper bound on voltage magnitude at buses, limit on thermal line losses. For brevity denote by vector $\xi_{eq}$ of size $2|N|+4|E|\xi_{eq}=(\alpha_i,\beta_i,\lambda_{ij},\gamma_{ij})$, by vector $\xi_{in}$ of size $2|N|+|E|\xi_{in}=(\underline{v}_i,\overline{v}_i,v_{ij})$, by vector $\xi$ of size $4|N|+5|E|\xi=(\xi_{eq},\xi_{in})$, vector x of size $2|N|$ x=(Re(V),Im(V)), z=$(P^G,Q^G,P,Q)$.

The Lagrangian function associated with OPF (Eq. 1) is $$L(x, z, \xi) = L^1(z, \xi) + x^T A(\xi) x \text{ where,}$$

$$L^1(z, \xi) = f(P^G, Q^G, x) + \sum_{(i,j) \in E} (\lambda_{ij}P_{ij} + \gamma_{ij}Q_{ij} + \lambda_{ji}P_{ji} + \lambda_{ji}Q_{ji}) +$$

$$\sum_{i \in N} \left( \underline{v}_i (V_i^{min})^2 - \overline{v}_i (V_i^{max})^2 \right) - \sum_{(i,j) \in E} \mu_{ij} L_{ij}^{max} - \sum_{i \in N} (\alpha_i P_i^D + \beta_i Q_i^D)$$

-continued $$A(\xi) = \sum_{i \in N} (-\alpha_i Y_i - \alpha_i \overline{Y}_i + (\overline{v}_i - \underline{v}_i) M_i) +$$

$$\sum_{(i,j) \in E} (-\lambda_{ij}Y_{ij} - \gamma_{ij}\overline{Y}_{ij} - \lambda_{ji}Y_{ji} - \gamma_{ji}\overline{Y}_{ji} + \mu_{ij}M_{ij})$$

where $x^T$ denotes the transpose of the vector x. The Lagrangian dual function $g(\xi)$ is defined by $$g(\xi) = \inf_{x,z} L(z, x, \xi) \quad \text{(Eq. 3)}$$

$$\text{s.t. } \underline{P}_i^G \leq P_i^G \leq \overline{P}_i^G, \underline{Q}_i^G \leq Q_i^G \leq \overline{Q}_i^G \forall i \in N$$

$$P_{ij} \leq P_{ij}^{max}, P_{ji} \leq P_{ij}^{max} \forall (i, j) \in E$$

$$(P_{ij})^2 + (Q_{ij})^2 \leq (S_{ij}^{max})^2,$$

$$(P_{ji})^2 + (Q_{ji})^2 \leq (S_{ij}^{max})^2 \forall (i, j) \in E.$$

The optimal value of dual function is obtained by $$\max_{\xi} g(\xi) \text{ s.t. } \xi_{in} \geq 0, \xi_{eq}, \quad \text{(Eq. 4)}$$

in which $\xi_{eq}$ is unrestricted in sign.

The optimal value obtained from Eq. (4) is a lower bound (L) for OPF (Eq. 1). The solution proceeds in two steps: (i) solving (Eq. 3) for some $\xi$, and (ii) iterating on $\xi$ until (Eq. 4) is solved.

The solution to Lagrangian dual function is decomposed into the following subproblems:

for each generator $$\min_{P_i^G, Q_i^G} \sum_{i \in N} \left( c_{2i}(P_i^G)^2 + c_{1i}P_i^G + c_{0i} - \alpha_i P_i^G - \beta_i Q_i^G \right) \quad Q_i^{min} \leq Q_i^G \leq Q_i^{max},$$
$$\text{s.t.} P_i^{min} \leq P_i^G \leq P_i^{max},$$

for line flows $$\min_{P_{ij}, Q_{ij}} \lambda_{ij}P_{ij} + \gamma_{ij}Q_{ij} \text{ s.t. } P_{ij} \leq P_{ij}^{max}, (P_{ij})^2 + (Q_{ij})^2 \leq (S_{ij})^2$$

$$\min_{P_{ij}, Q_{ij}} \lambda_{ji}P_{ji} + \gamma_{ji}Q_{ji} \text{ s.t. } P_{ji} \leq P_{ij}^{max}, (P_{ji})^2 + (Q_{ji})^2 \leq (S_{ij})^2$$

for voltages $$\min_{x} x^T A(\xi) x \text{ s.t. } \Delta_L \leq x^T x \leq \Delta_U$$

$$\text{where, } \Delta_L = \sum_{i \in N} (V_i^{min})^2, \Delta_U = \sum_{i \in N} (V_i^{max})^2.$$

The maximization problem which iterates on $\xi$ is solved using a subgradient procedure as, $$\xi_{eq}^{k+1} = \xi_{eq}^k + s^k g_{eq}^k, \xi_{in}^{k+1} = [\xi_{in}^k + s^k g_{in}^k]^+$$

where [ ]$^+$ denotes the projection on to the nonnegative orthant $s^k$ is a step size.

$g_{eq}^k$ the residual of equality constraints that are dualized $g_{in}^k$ denotes the residual of inequality constraints that are dualized.

The maximization problem can also be solved using a bundle method or any other nonsmooth optimization procedure. When the lower and upper bounds for power generation variables and voltage magnitudes are updated as described below, the appropriate values are used in the subproblems (i), (ii) and (iii) describe above.

Figure 3:
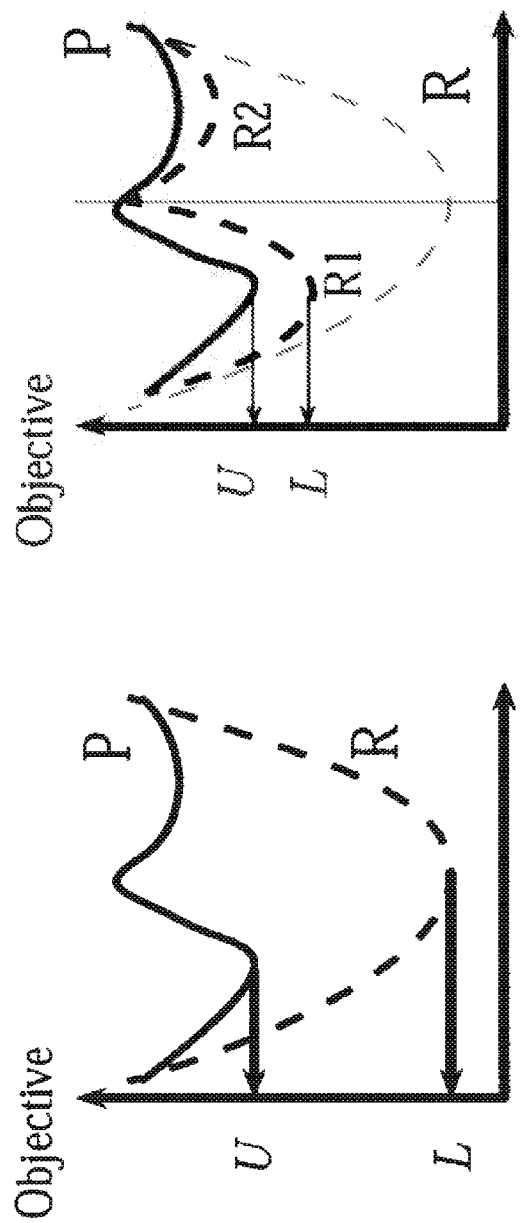
FIG. 3 is a graph of upper and lower bounds used by embodiments of the invention.

As shown in FIG. 3, the upper bound (U) can be determined by using local minimization, which also yields a feasible solution. The BB updates the lowest upper bound ($U^{best}$), if $U<U^{best}$. The BB updates the lowest lower bound ($L^{best}$) based on the nodes in the tree that are to be explored and lower bound obtained for the current node (L). For nodes in BB tree that have not been solved an estimate of the lower bound is used. This is typically the lower bound value of the parent node from which it was derived. If ($U^{best}-L^{best}$), or optionally ($U^{best}-L^{best})/U^{best}$, is less than some predetermined threshold τ, then the BB procedure terminates with the current upper bounding solution.

Otherwise, if (U−L), or (U−L)/U or ($U^{best}$−L) is less than some predetermined threshold τ, then the current node is deleted from the BB tree and another node from the BB tree is selected to update and possibly improve the lower and upper bound using the solving steps.

Figure 4:
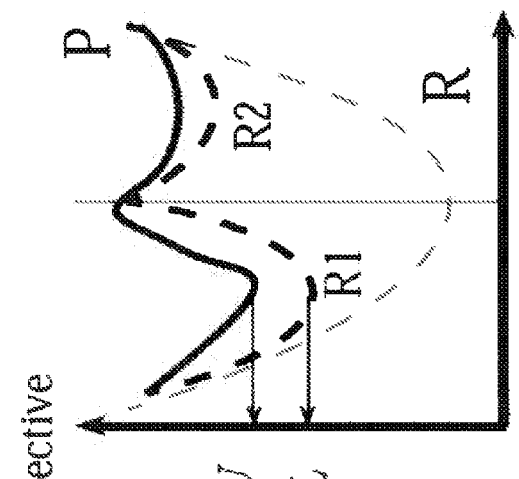
FIG. 4 is a graph of optimized bounds according to embodiments of the invention.

Otherwise as shown in FIG. 4, the feasible region R is partitioned into R1 and R2, and the BB procedure is repeated, and so forth. In other words, if there is an optimality gap, the feasible region is partitioned into two sub-regions, over which the BB procedure is repeated. Nodes are deleted (in branch and bound terms "fathomed" x) when the lower bound L is greater than the current best upper bound, see FIG. 2.

The BB procedure terminates when there are no more nodes to be processed. In that case, the best upper bounding solution is returned as the globally optimal solution.

Figure 5:
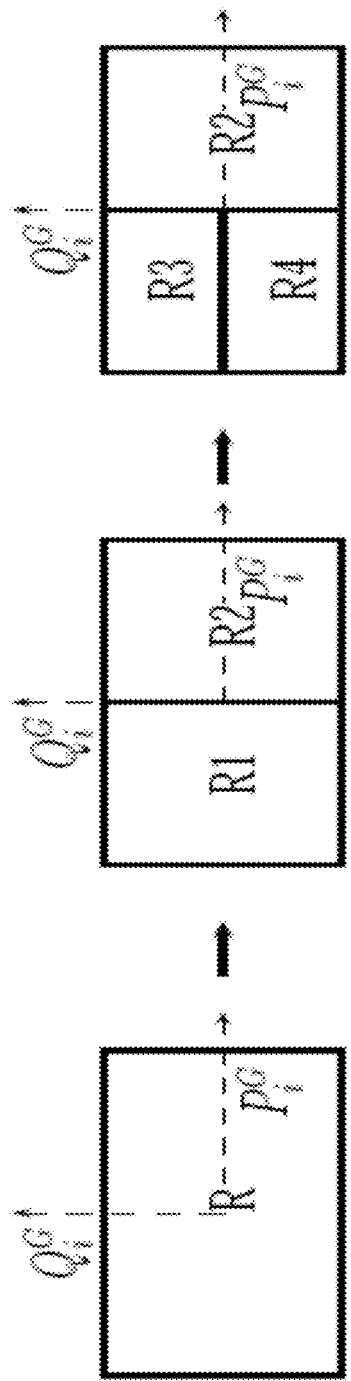
FIG. 5 is a schematic of a rectangular partitioning according to embodiments of the invention.
Figure 6:
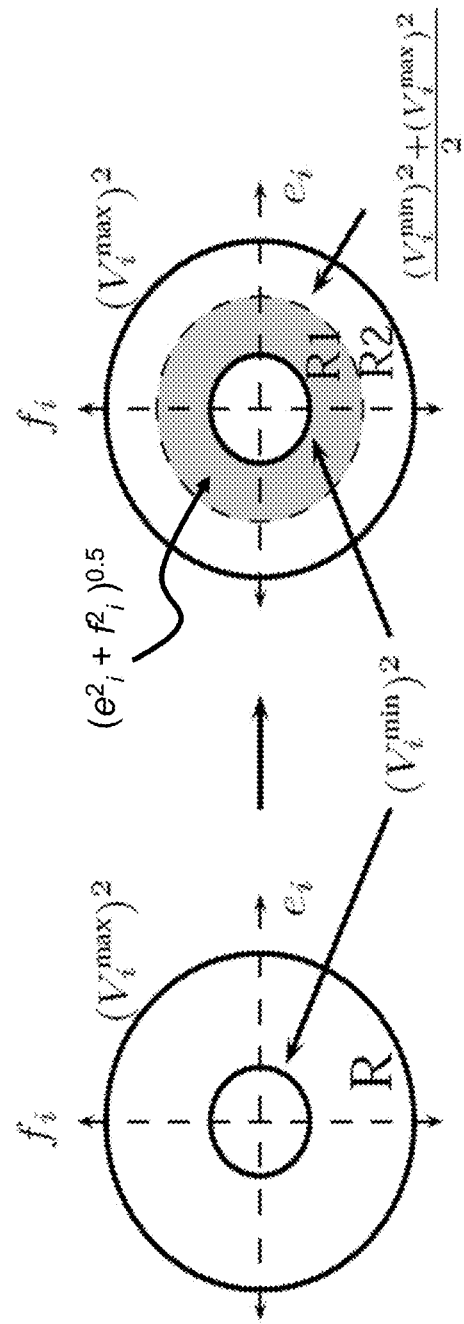
FIG. 6 is a schematic of a radial partitioning according to embodiments of the invention.

The partitioning of the feasible region can be accomplished by rectangular bisection on $P^G_i$ or $Q^G_i$ as shown in FIG. 5, or by radial bisection on the voltage magnitudes $(e^2_i + f^2_i)^{0.5}$ as shown in FIG. 6.

Additional Constraints

In another embodiment, additional constraints that strengthen the semidefinite programming relaxations are used. The constraints are derived by analyzing the power flow equations. Consider writing the real line flow constraint $P_{ij}=Tr(Y_{ij}W)$ in terms of the original voltage variables of the buses, $$P_{ij}=g_{ij}(Re(V_i)^2+Im(V_i)^2+Im(V_i)^2)+g_{ij}(Re(V_i)Re(V_j)+Im(V_i)Im(V_j))+b_{ij}(Re(V_i)Im(V_j)-Im(V_i)Re(V_j))$$

where, $g_{ij}$ is the line conductance, $b_{ij}$ is the line susceptance.

The above equations can be modified when the transmission line includes a transformer. The following description of the constraints also applies to that case. The matrix formulation $P_{ij}=Tr(Y_{ij}W)$ is obtained essentially by replacing the quadratic terms in the above equality by terms $$Re(V_i)^2, Im(V_i)^2, Re(V_i)Re(V_j), Re(V_i)Im(V_j), Im(V_i)Re(V_j), Im(V_i)Im(V_j)$$

with respectively the matrix entries $$W_{ii}, W_{(|N|+i)(|N|+i)}, W_{ij}, W_{i(|N|+j)}, W_{(|N|+i)j}, W_{(|N|+i)(|N|+j)}, W_{(|N|+j)}$$, where $W_{ij}$ refers to the element of the matrix W corresponding to row i and column j.

By considering the range of the quadratic terms in the above equation bounds can be derived on the matrix entries.

Denoting by $$\zeta_{g,ij}^{max} = \sup_{V_i,V_j}(Re(V_i)Re(V_j)+Im(V_i)Im(V_j))$$

$$s.t. (V_i^{min})^2 \leq Re(V_i)^2+Im(V_i)^2 \leq (V_i^{max})^2;$$

$$(V_j^{min})^2 \leq Re(V_j)^2+Im(V_j)^2 \leq (V_j^{max})^2$$

$$\zeta_{g,ij}^{min} = \inf_{V_i,V_j}(Re(V_i)Re(V_j)+Im(V_i)Im(V_j))$$

$$s.t. (V_i^{min})^2 \leq Re(V_i)^2+Im(V_i)^2 \leq (V_i^{max})^2;$$

$$(V_j^{min})^2 \leq Re(V_j)^2+Im(V_j)^2 \leq (V_j^{max})^2$$

where sup refers to the supremum value (or global maximum) of the objective function and inf refers to the infirnum value (or global minimum) of the objective, function. The values $\zeta_{g,ij}^{min}, \zeta_{g,ij}^{max}$ are computed analytically as a function of the voltage magnitude bounds. Hence, as the procedure proceeds by partitioning, the feasible region, and the new lower and upper bounds can be computed by rescaling. Similarly the range for the other bilinear term in the real power balance equation can be computed as, $$\zeta_{b,ij}^{max} = \sup_{V_i,V_j}(Re(V_i)Im(V_j)-Im(V_i)Re(V_j))$$

$$s.t. (V_i^{min})^2 \leq Re(V_i)^2+Im(V_i)^2 \leq (V_i^{max})^2;$$

$$(V_j^{min})^2 \leq Re(V_j)^2+Im(V_j)^2 \leq (V_j^{max})^2.$$

Based on the computed quantities the following constraint can be added to semidefinite programming relaxation to strengthen the lower bound that is computed $$\zeta_{g,ij}^{min} \leq W_{ij}+W_{(|N|+i)(|N|+j)} \leq \zeta_{g,ij}^{max}$$

$$\zeta_{g,ij}^{min} \leq W_{i(|N|+j)}+W_{(|N|+i)j} \leq \zeta_{b,ij}^{max}. \quad (Eq. 5)$$

As described above, the bounds are recomputed when the limits on the voltage magnitudes are modified as the procedure partitions the voltage magnitude constraints on the buses. Constraints of the form describe in (Eq. 5) are derived for every line in the network and added to the semidefinite relaxation.

In another embodiment, the strengthening constraints are obtained by considering a combination of the quadratic terms. Consider the real power flow constraint and compute bounds as follows.

$$\omega_{P,ij}^{max} = \sup_{V_i,V_j} g_{ij}(Re(V_i)Re(V_j)+Im(V_i)Im(V_j))+b_{ij}(Re(V_i)Im(V_j)-Im(V_i)Re(V_j))$$

$$s.t. (V_i^{min})^2 \leq Re(V_i)^2+Im(V_i)^2 \leq (V_i^{max})^2;$$

$$(V_j^{min})^2 \leq Re(V_j)^2+Im(V_j)^2 \leq (V_j^{max})^2$$

$$\omega_{P,ij}^{min} = \inf_{V_i,V_j} g_{ij}(Re(V_i)Re(V_j)+Im(V_i)Im(V_j))+b_{ij}(Re(V_i)Im(V_j)-Im(V_i)Re(V_j))$$

$$s.t. (V_i^{min})^2 \leq Re(V_i)^2+Im(V_i)^2 \leq (V_i^{max})^2;$$

$$(V_j^{min})^2 \leq Re(V_j)^2+Im(V_j)^2 \leq (V_j^{max})^2$$

Using these bounds strengthened bounds constraints on matrix entries are added to the semidefinite programming relaxation as, $$\omega_{P,ij}^{min} \le g_{ij}(W_{ij}+W_{(|N|+i)(|N|+j)})+b_{ij}(W_{i(|N|+j)}+W_{(|N|+i)j}) \le \omega_{P,ij}^{max}. \quad \text{(Eq. 6)}$$

Similarly, considering the reactive line flow constraints on (i,j) and the combination of quadratic terms that appear, bounds can be computed and constraints can be imposed on the entries of the matrix W. Constraints of the form describe in (Eq. 5) are derived for every line in the network and added to the semidefinite relaxation.

In another embodiment, the strengthening constraints are obtained by considering the entire term on the right hand side of the power flow equations. Consider the real power flow constraint and compute bounds as follows, $$\sigma_{P,ij}^{max} = \sup_{V_i,V_j} \begin{pmatrix} g_{ij}(\text{Re}(V_i)^2 + \text{Im}(V_i)^2) + \\ g_{ij}(\text{Re}(V_i)\text{Re}(V_j) + \text{Im}(V_i)\text{Im}(V_j)) + \\ b_{ij}(\text{Re}(V_i)\text{Im}(V_j) - \text{Im}(V_i)\text{Re}(V_j)) \end{pmatrix}$$

$$\text{s.t.} (V_i^{min})^2 \le \text{Re}(V_i)^2 + \text{Im}(V_i)^2 \le (V_i^{max})^2;$$
$$(V_j^{min})^2 \le \text{Re}(V_j)^2 + \text{Im}(V_j)^2 \le (V_j^{max})^2$$

$$\sigma_{P,ij}^{min} = \inf_{V_i,V_j} \begin{pmatrix} g_{ij}(\text{Re}(V_i)^2 + \text{Im}(V_i)^2) + \\ g_{ij}(\text{Re}(V_i)\text{Re}(V_j) + \text{Im}(V_i)\text{Im}(V_j)) + \\ b_{ij}(\text{Re}(V_i)\text{Im}(V_j) - \text{Im}(V_i)\text{Re}(V_j)) \end{pmatrix}$$

$$\text{s.t.} (V_i^{min})^2 \le \text{Re}(V_i)^2 + \text{Im}(V_i)^2 \le (V_i^{max})^2;$$
$$(V_j^{min})^2 \le \text{Re}(V_j)^2 + \text{Im}(V_j)^2 \le (V_j^{max})^2.$$

Using these bounds, strengthened bounds constraints on matrix entries are added to the semidefinite programming relaxation as, $$\sigma_{P,ij}^{min} \le \quad \text{(Eq. 7)}$$
$$\begin{pmatrix} g_{ij}(W_{ii} + W_{(|N|+i)(|N|+i)}) + g_{ij}(W_{ij} + W_{(|N|+i)(|N|+j)}) + \\ b_{ij}(W_{i(|N|+j)} + W_{(|N|+i)j}) \end{pmatrix} \le \sigma_{P,ij}^{max}.$$

Similarly, considering the reactive line flow constraints on (i,j) and the real and reactive line flows from (j,i), and the combination of quadratic terms that appear, bounds can be computed and constraints can be imposed on the entries of the matrix W. Constraints of the form describe in (Eq. 5) are derived for every line in the network and added to the semidefinite relaxation.

Method

Figure 7:
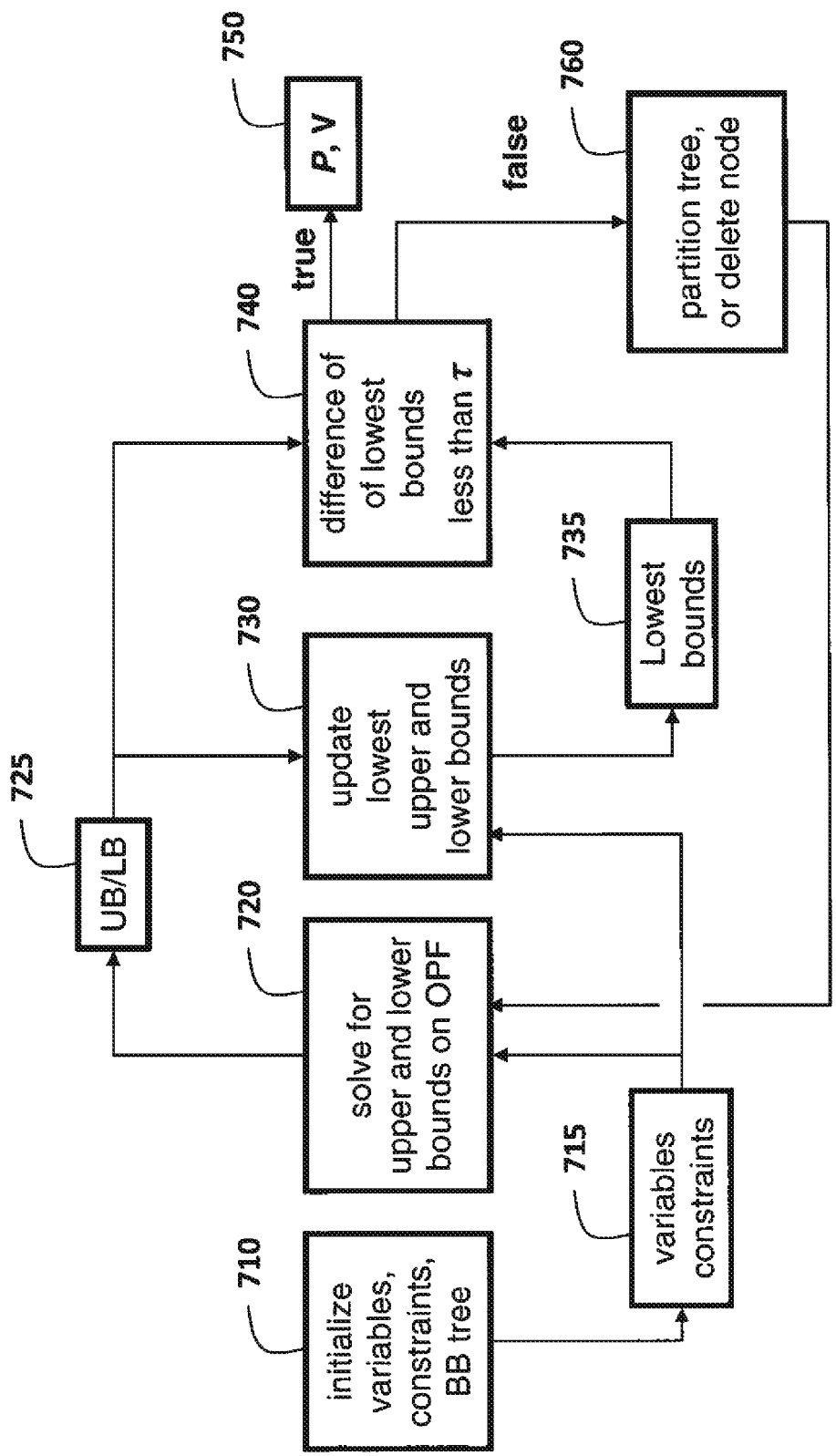
FIG. 7 is a flow diagram of a method according to embodiments of the invention.

FIG. 7 shows the steps of a method for optimizing globally an optimal power flow (OPF) problem in an electric power network according to embodiments of our invention. The steps can be performed in a processor connected to memory and input/output interfaces as known in the art.

Variables, constraints, and the BB tree 715 for the network are initialized 710 according to the network topology, components and physical operating conditions, and the like as described above. These are readily available from a provider for a particular network topology and components. The BB tree includes at least a root node.

Nodes in the tree are selected and solved one at the time, until the tree is empty.

Solve 720 for the upper and lower bounds 725 on the OPF problem. The upper bounds are solved using nonlinear programming, and the lower bounds use semi-definite programming.

The lowest upper and lower bound 735 found so far are updated 730 according to the current upper and lower bounds. These are the lowest bounds that are estimated for yet unselected nodes.

Determine 740 if a difference between the lowest upper bound and the lowest lower bound is less than a threshold, and if true, outputting the voltages and the powers 750 for the electric power network as represented by the feasibility region for the selected node.

Otherwise if false, determine whether a difference between the upper bound and the lower bound is greater than the threshold and whether the lower bound is less than the lowest upper bound (minus tolerance), and if this true, partitioning 760 the feasible region of the selected node to generate two nodes for the branch and bound tree by replacing the selected node by the two nodes, and repeat by selecting another node, unless the tree is empty. Otherwise if false, delete the selected node and select another node.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for optimizing globally a optimal power flow (OPF) problem in an electric power network, wherein the optimizing of the OPF problem is a minimization, and the optimizing of the OPF problem maintains a branch and bound (BB) tree of nodes connected by edges, and the BB tree initially includes at least a root node, wherein each node in the branch and bound tree represents a feasible region of limits on voltages and powers in the electric power network, comprising, the steps of:

selecting one node in the BB tree;
   solving, for the selected node, an upper bound on the OPF problem using nonlinear programming, and variables and constraints of the electric power network;
   solving, for the selected node, a lower bound on the OPF problem using a convex relaxation, and the variables and the constraints;
   updating a lowest upper bound and a lowest lower bound for OPF problem based on the upper bound and the lower bound;
   determining whether a difference between the lowest upper bound and the lowest lower bound is less than a threshold, and if true, outputting the voltages and the powers for the electric power network as represented by a feasibility region for the selected node; and otherwise if false
   determining whether a difference between the upper bound and the lower bound is greater than the threshold and whether the lower bound is less than the lowest upper bound, and if true, partitioning the feasible region of the selected node to generate two nodes for the branch and bound tree by replacing the selected node by the two nodes, and repeating selecting, solving, updating, determining steps until the difference between the lowest upper bound and the lowest lower bound is less than a threshold; and otherwise if false
   deleting the selected node and repeat beginning at the selecting step, unless the tree is empty.

2. The method as in claim 1, further comprising:
   solving a semidefinite relaxation of the OPF to obtain the lower bound.

3. The method as in claim 1, further comprising:
   solving a Lagrangian dual relaxation of the OPF to obtain the lower bound.

4. The method as in claim 1, further comprising:
solving a linear relaxation of the OPF to obtain the lower bound.

5. The method as in claim 2, further comprising:
adding constraints to the semidefinite relaxation according to $$\zeta_{g,ij}^{min} \leq W_{ij} + W_{(|N|+i)(|N|+j)} \leq \zeta_{g,ij}^{max}$$

$$\zeta_{b,ij}^{min} \leq W_{i(|N|+j)} + W_{(|N|+i)j} \leq \zeta_{b,ij}^{max},$$

where N is a number of nodes in the BB tree, ij represent lines in the network corresponding to edges between nodes i and j, $\zeta_{g,ij}^{min}$ and $\zeta_{g,ij}^{max}$ denotes infimum and supremum values of voltage product terms $Re(V_i)Re(V_j)+Im(V_i)Im(V_j)$, where $Re(V_i)$, $Im(V_i)$ represent real and imaginary parts of complex valued voltage at bus i, $g_{ij}$ represents conductance on the lines ij, $b_{ij}$ represents susceptance of the lines, $\zeta_{b,ij}^{min}$ and $\zeta_{b,ij}^{max}$ denotes the infimum and supremum values of voltage product terms $Re(V_i)Im(V_j)-Im(V_i)Re(V_j)$, W is a positive semidefinite symmetric matrix, and $W_{ij}$ denotes an entry in matrix W at row i for node i and column j for node j.

6. The method as in claim 5, further comprising:
adding constraints $$\omega_{P,ij}^{min} \leq g_{ij}(W_{ij}+W_{(|N|+i)(|N|+j)})+b_{ij}(W_{i(|N|+j)}+W_{(|N|+i)j}) \leq \omega_{P,ij}^{max}$$

to the semidefinite relaxation, where $\omega^{min}_{P,ij}$, $\omega^{max}_{P,ij}$ represents the infimum and supremum values of terms $g_{ij}(Re(V_i)Re(V_j)+Im(V_i)Im(V_j))+b_{ij}(Re(V_i)Im(V_j)-Im(V_i)Re(V_j))$.

7. The method as in claim 5, further comprising:
adding constraints $$\sigma_{P,ij}^{min} \leq \begin{pmatrix} g_{ij}(W_{ii}+W_{(|N|+i)(|N|+i)}) + g_{ij}(W_{ij}+W_{(|N|+i)(|N|+j)}) + \\ b_{ij}(W_{i(|N|+j)}+W_{(|N|+i)j}) \end{pmatrix} \leq \sigma_{P,ij}^{max},$$

to the semidefinite relaxation, where $\sigma^{min}_{P,ij}$, $\sigma^{max}_{P,ij}$ represents the infimum and supremum values of terms $g_{ij}(Re(V_i)^2+Im(V_i)^2)+g_{ij}(Re(V_i)Re(V_j)+Im(V_i)Im(V_j))+b_{ij}(Re(V_i)Im(V_j)-Im(V_i)Re(V_j))$.

* * * * *